United States Patent
Foster et al.

(10) Patent No.: US 9,141,513 B2
(45) Date of Patent: Sep. 22, 2015

(54) MAINTAINING A SECURE COMPUTING DEVICE IN A TEST TAKING ENVIRONMENT

(75) Inventors: David Foster, East Lindon, UT (US);
Russ Bonsall, Chandler, AZ (US); Jeff Caddel, Phoenix, AZ (US); William Dormann, Phoenix, AZ (US); Laura Perryman, Scottsdale, AZ (US); John Peeke-Vout, Phoenix, AZ (US)

(73) Assignee: Kryterion, Inc., Phoenix, AZ (US)

( * ) Notice: Subject to any disclaimer, the term of this patent is extended or adjusted under 35 U.S.C. 154(b) by 167 days.

(21) Appl. No.: 12/571,666

(22) Filed: Oct. 1, 2009
(Under 37 CFR 1.47)

(65) Prior Publication Data
US 2012/0077176 A1     Mar. 29, 2012

(51) Int. Cl.
| | |
|---|---|
| G09B 7/00 | (2006.01) |
| G09B 3/00 | (2006.01) |
| G06F 11/36 | (2006.01) |
| G09B 5/00 | (2006.01) |
| G09B 7/04 | (2006.01) |

(52) U.S. Cl.
CPC .............. *G06F 11/3664* (2013.01); *G09B 7/00* (2013.01); *G09B 5/00* (2013.01); *G09B 7/04* (2013.01)

(58) Field of Classification Search
CPC .............. G09B 7/04; G09B 5/00; G09B 7/00; G06F 11/3664
USPC .......................................... 434/323, 350, 362
See application file for complete search history.

(56) References Cited

U.S. PATENT DOCUMENTS

| | | | |
|---|---|---|---|
| 4,458,315 | A | 7/1984 | Uchenick |
| 4,951,249 | A | 8/1990 | McClung et al. |
| 5,204,813 | A | 4/1993 | Samph et al. |
| 5,211,564 | A | 5/1993 | Martinez et al. |
| 5,361,359 | A | 11/1994 | Tajalli et al. |
| 5,412,717 | A | 5/1995 | Fischer |
| 5,635,940 | A | 6/1997 | Hickman et al. |
| 5,743,743 | A | 4/1998 | Ho et al. |
| 5,809,230 | A | 9/1998 | Pereira |
| 5,867,646 | A | 2/1999 | Benson et al. |
| 5,915,973 | A | 6/1999 | Hoehn-Saric et al. |
| 5,919,257 | A | 7/1999 | Trostle |
| 5,987,611 | A | 11/1999 | Freund |

(Continued)

FOREIGN PATENT DOCUMENTS

| | | |
|---|---|---|
| CN | 1949186 | 4/2007 |
| CN | 102696019 A | 9/2012 |

(Continued)

OTHER PUBLICATIONS

David Arnow et al., "On-line Programming Examinations Using WebToTeach," ITiCSE '99 Jun. 1999, Cracow, Poland, pp. 21-24.

(Continued)

*Primary Examiner* — Michael Grant
(74) *Attorney, Agent, or Firm* — Lewis Roca Rothgerber LLP

(57) ABSTRACT

The presently disclosed invention provides for the security of a computing device in the context of a test taking environment. By securing a computing device, an individual (or group of individuals) may more effectively proctor a large examination without worrying about a test taker illicitly accessing information on their computer or via a remote source of data. Securing a computing device includes locking out or preventing access to any application not deemed necessary or appropriate by the test administrator.

19 Claims, 3 Drawing Sheets

(56) References Cited

U.S. PATENT DOCUMENTS

| | | | |
|---|---|---|---|
| 6,021,438 A | 2/2000 | Duvvoori et al. | |
| 6,112,049 A | 8/2000 | Sonnenfeld | |
| 6,185,619 B1 | 2/2001 | Joffe et al. | |
| 6,266,773 B1* | 7/2001 | Kisor et al. | 726/17 |
| 6,281,894 B1 | 8/2001 | Rive | |
| 6,282,404 B1 | 8/2001 | Linton | |
| 6,282,573 B1 | 8/2001 | Darago et al. | |
| 6,338,149 B1 | 1/2002 | Ciccone, Jr. et al. | |
| 6,418,298 B1 | 7/2002 | Sonnenfeld | |
| 6,427,063 B1 | 7/2002 | Cook et al. | |
| 6,453,398 B1 | 9/2002 | McKenzie | |
| 6,523,119 B2 | 2/2003 | Pavlin et al. | |
| 6,694,434 B1 | 2/2004 | McGee et al. | |
| 6,766,458 B1 | 7/2004 | Harris | |
| 6,948,153 B2 | 9/2005 | Bowers | |
| 6,954,456 B2 | 10/2005 | Cranor et al. | |
| 6,966,048 B2 | 11/2005 | Bowers | |
| 7,069,586 B1 | 6/2006 | Winneg et al. | |
| 7,080,303 B2 | 7/2006 | Bowers | |
| 7,165,269 B2* | 1/2007 | Winneg et al. | 726/16 |
| 7,194,664 B1 | 3/2007 | Fung | |
| 7,293,281 B1 | 11/2007 | Moran et al. | |
| 7,318,727 B2 | 1/2008 | Bowers | |
| 7,494,340 B2 | 2/2009 | Bowers et al. | |
| 7,725,737 B2* | 5/2010 | Konanka et al. | 713/190 |
| 7,886,029 B2* | 2/2011 | Rogers et al. | 709/220 |
| 8,713,130 B2 | 4/2014 | Logan | |
| 2002/0056010 A1 | 5/2002 | Lincoln et al. | |
| 2002/0078139 A1 | 6/2002 | Dutta | |
| 2002/0111173 A1 | 8/2002 | Hendrey et al. | |
| 2002/0172931 A1* | 11/2002 | Greene et al. | 434/322 |
| 2003/0140111 A1 | 7/2003 | Pace et al. | |
| 2003/0158928 A1 | 8/2003 | Knox et al. | |
| 2004/0010544 A1 | 1/2004 | Slater et al. | |
| 2004/0010720 A1 | 1/2004 | Singh et al. | |
| 2004/0080504 A1 | 4/2004 | Salesky et al. | |
| 2004/0172466 A1 | 9/2004 | Douglas et al. | |
| 2004/0229199 A1* | 11/2004 | Ashley et al. | 434/323 |
| 2004/0230488 A1 | 11/2004 | Beenau et al. | |
| 2004/0236843 A1 | 11/2004 | Wing | |
| 2005/0086498 A1 | 4/2005 | Hulick | |
| 2005/0240935 A1 | 10/2005 | Ramanathan | |
| 2006/0080656 A1 | 4/2006 | Cain et al. | |
| 2006/0085528 A1 | 4/2006 | Thomas | |
| 2006/0174320 A1* | 8/2006 | Maru et al. | 726/1 |
| 2006/0174338 A1 | 8/2006 | Winneg et al. | |
| 2007/0016777 A1 | 1/2007 | Henderson | |
| 2007/0048723 A1* | 3/2007 | Brewer et al. | 434/350 |
| 2007/0117082 A1 | 5/2007 | Winneg et al. | |
| 2007/0117083 A1* | 5/2007 | Winneg et al. | 434/350 |
| 2007/0162894 A1 | 7/2007 | Noller | |
| 2008/0049777 A1 | 2/2008 | Morrill et al. | |
| 2009/0035740 A1 | 2/2009 | Reed et al. | |
| 2009/0196486 A1 | 8/2009 | Distante et al. | |
| 2009/0222552 A1* | 9/2009 | Chroscielewski et al. | 709/224 |
| 2009/0222907 A1* | 9/2009 | Guichard | 726/17 |
| 2010/0055659 A1 | 3/2010 | Rogers et al. | |
| 2011/0177484 A1 | 7/2011 | Morgan et al. | |
| 2011/0179491 A1* | 7/2011 | Spurlock et al. | 726/24 |
| 2011/0207108 A1 | 8/2011 | Dorman | |
| 2011/0223576 A1 | 9/2011 | Foster | |
| 2011/0244440 A1 | 10/2011 | Saxon | |
| 2011/0279228 A1 | 11/2011 | Kumar | |
| 2012/0034584 A1 | 2/2012 | Logan | |
| 2012/0036215 A1 | 2/2012 | Perryman | |
| 2012/0077177 A1 | 3/2012 | Foster | |
| 2012/0135388 A1 | 5/2012 | Foster | |
| 2012/0176220 A1 | 7/2012 | Garcia | |
| 2012/0183181 A1 | 7/2012 | You | |
| 2013/0307766 A1 | 11/2013 | Amathnadu et al. | |
| 2014/0162228 A1 | 6/2014 | Logan | |
| 2014/0272882 A1 | 9/2014 | Kaufmann | |

FOREIGN PATENT DOCUMENTS

| | | |
|---|---|---|
| EP | 2 483 781 | 8/2012 |
| WO | WO 2011/041707 | 4/2011 |
| WO | WO 2011/115644 | 9/2011 |
| WO | WO 2012/018411 | 2/2012 |
| WO | WO 2012/018412 | 2/2012 |
| WO | WO 2014/159785 | 10/2014 |

OTHER PUBLICATIONS

R. Sekar et al., "Synthesizing Fast Intrusion Prevention/Detection Systems From High-Level Specifications," Proceedings of the 8th USENIX Security Symposium, Washington, D.C., Aug. 23-26, 1999, 17 pages.

PCT Application No. PCT/US2010/051811, International Search Report and Written Opinion mailed Nov. 29, 2010.

PCT Application No. PCT/US2011/25533, International Search Report and Written Opinion mailed Apr. 19, 2011.

PCT Application No. PCT/US2011/25545, International Search Report and Written Opinion mailed Apr. 27, 2011.

European Application No. 10821352.1, Office Action mailed May 30, 2012.

U.S. Appl. No. 12/723,663, Office Action mailed Dec. 6, 2012.

U.S. Appl. No. 12/723,663, Final Office Action mailed Aug. 16, 2012.

U.S. Appl. No. 12/723,663, Office Action mailed Feb. 15, 2012.

U.S. Appl. No. 12/723,666, Office Action mailed Dec. 6, 2012.

U.S. Appl. No. 12/723,666, Final Office Action mailed Aug. 1, 2012.

U.S. Appl. No. 12/723,666, Office Action mailed Mar. 29, 2012.

U.S. Appl. No. 12/727,667, Office Action mailed Dec. 6, 2012.

U.S. Appl. No. 12/727,667, Final Office Action mailed Aug. 16, 2012.

U.S. Appl. No. 12/727,667, Final Office Action mailed Feb. 15, 2012.

U.S. Appl. No. 12/850,136, Final Office Action mailed Sep. 12, 2012.

U.S. Appl. No. 12/850,136, Office Action mailed Mar. 9, 2012.

U.S. Appl. No. 12/899,085, Office Action mailed Jul. 31, 2012.

U.S. Appl. No. 12/913,694, Office Action mailed Dec. 7, 2012.

PCT Application No. PCT/US2010/051169, International Search Report and Written Opinion mailed Nov. 26, 2010.

U.S. Appl. No. 12/723,663, Office Action mailed Dec. 18, 2013.

U.S. Appl. No. 12/723,663, Final Office Action mailed Oct. 8, 2013.

U.S. Appl. No. 12/723,663, Office Action mailed Jul. 17, 2013.

U.S. Appl. No. 12/723,663, Final Office Action mailed Apr. 5, 2013.

U.S. Appl. No. 12/723,666, Final Office Action mailed Dec. 18, 2013.

U.S. Appl. No. 12/723,666, Office Action mailed Jun. 19, 2013.

U.S. Appl. No. 12/723,666, Final Office Action mailed Apr. 5, 2013.

U.S. Appl. No. 12/723,667, Final Office Action mailed Dec. 23, 2013.

U.S. Appl. No. 12/723,667, Office Action mailed Oct. 3, 2013.

U.S. Appl. No. 12/723,667, Final Office Action mailed Apr. 10, 2013.

U.S. Appl. No. 12/850,136, Final Office Action mailed Oct. 31, 2013.

U.S. Appl. No. 12/850,136, Office Action mailed Apr. 15, 2013.

U.S. Appl. No. 12/899,085, Final Office Action mailed Mar. 5, 2013.

U.S. Appl. No. 12/899,085, Office Action mailed Oct. 8, 2013.

U.S. Appl. No. 12/913,694, Final Office Action mailed Aug. 29, 2013.

U.S. Appl. No. 12/913,694, Final Office Action mailed May 7, 2013.

U.S. Appl. No. 12/913,694, Office Action mailed Jan. 30, 2013.

U.S. Appl. No. 12/913,697, Office Action mailed Jan. 3, 2014.

U.S. Appl. No. 12/850,136, Office Action mailed Jan. 27, 2015.

U.S. Appl. No. 12/723,663, Final Office Action mailed Jan. 30, 2015.

U.S. Appl. No. 12/723,667, Office Action mailed Jan. 14, 2015.

U.S. Appl. No. 14/179,410, Final Office Action mailed Nov. 21, 2014.

U.S. Appl. No. 12/899,085, Final Office Action mailed Jan. 26, 2015.

Chinese Application No. 201080050561.2, Office Action dated Mar. 31, 2014.

U.S. Appl. No. 12/913,697, Final Office Action mailed Apr. 14, 2014.

PCT Application No. PCT/US2014/025131, International Search Report and Written Opinion mailed Jul. 11, 2014.

U.S. Appl. No. 12/723,666, Office Action mailed Jul. 18, 2014.

U.S. Appl. No. 12/899,085, Office Action mailed Sep. 12, 2014.

U.S. Appl. No. 14/179,410, Office Action mailed Aug. 11, 2014.

(56) References Cited

OTHER PUBLICATIONS

Chinese Application No. 201080050561.2, Second Office Action dated Oct. 23, 2014.
U.S. Appl. No. 12/723,663, Office Action mailed Oct. 7, 2014.
U.S. Appl. No. 14/207,637, Final Office Action mailed Oct. 17, 2014.
U.S. Appl. No. 12/723,663, Final Office Action mailed Jun. 16, 2014.
U.S. Appl. No. 12/723,667, Office Action mailed Jun. 2, 2014.
U.S. Appl. No. 14/207,637, Office Action mailed Jun. 23, 2014.
U.S. Appl. No. 12/723,666, Final Office Action mailed Apr. 9, 2015.
U.S. Appl. No. 12/913,697, Office Action mailed May 4, 2015.
U.S. Appl. No. 14/207,637, James Kaufman, Detecting Aberrant Behavior in an Exam-Taking Environment, filed Mar. 13, 2014.
PCT/US14/25131, Detecting Aberrant Behavior in an Exam-Taking Environment, Filing Date Mar. 13, 2014.
14/179,410, David Logan, Peered Proctoring, filed Feb. 12, 2014.
Chinese Application No. 201080050561.2, Third Office Action dated Mar. 30, 2015.

\* cited by examiner

MAINTAINING A SECURE COMPUTING DEVICE IN A TEST TAKING ENVIRONMENT

BACKGROUND OF THE INVENTION

1. Field of the Invention

The present invention generally relates to online testing. More specifically, the present invention concerns maintaining the security of a computing device in an online test taking environment.

2. Description of the Related Art

Tests are used to determine the ability of a test taker (e.g., a student or prospective practitioner) as it pertains to proficiency in a particular subject or skill set. For example, a student might take a test to determine whether the student possesses the requisite knowledge in a particular subject that might be related to receiving a degree or certificate. A prospective practitioner in law or medicine might similarly sit for examination to determine their competence as it pertains practicing in that profession.

Every student has at some point taken a test whereby a class of approximately 30 students assembles in a classroom prior to the posted test time. Testing materials are then handed out and the test begins. During the allotted test time—usually an hour to 90 minutes—students read questions and provide answers on a provided answer sheet or in a 'blue book.' As students take the test, the teacher or a proctor keeps careful watch over the test takers to ensure that no instances of cheating are taking place.

While a single proctor proves useful for a small class of students, such observation becomes more difficult for a larger class size. This might be true in a college environment, for example, where a particular degree or discipline has certain 'core' classes taken by all students seeking a particular degree or studying within a particular college. It is not unusual for a first year mathematics or chemistry course to have upwards of 150 students sitting for a single examination. In orderly to effectively prevent instances of cheating, several proctors must be utilized to keep watch over the student test takers.

This problem has become even more pronounced as an increased number of students take examinations on a laptop computer. A proctor once only needed to keep a watch for a test taker slipping out an obvious 'cheat sheet' or looking over the shoulder of a neighboring test taker. Test takers can now store notes or other information related to an examination in a file accessible on their desktop. Test takers can easily and quietly access that illicit information during the examination. The test taker can quickly close out the file as a proctor moves about the room or even delete the file in its entirety thus eliminating any proof that cheating ever took place. Built in wireless cards and pervasive wireless networks also allow test takers with easy access to the Internet or other remote sources of information.

As the number of test takers increases, so does the need for additional proctors. Tests such as college entrance examinations may be offered on a nationwide network with multiple testing sites all offering the examination on a single date. An example of a 'nationwide' examination is the SAT Reasoning Test. In 2006, the SAT Reasoning Test was, over the course of the year, taken by almost 1.5 million prospective college students. Another example of a large scale examination is the Multistate Bar Examination (MBE). In 2007, the MBE was taken by almost 75,000 prospective attorneys in 53 different jurisdictions.

The 'high stakes' nature of the examination (i.e., potential college admission or the ability to practice law) creates a greater motivation for cheating. Due to the increased risk of cheating and the large number of students at each testing site, multiple proctors must be utilized at each site. If the test happens to be a time intensive examination—as is the case with both the SAT Reasoning Test and the MBE, which are both approximately 3 hours in length—then even more proctors are needed to 'relieve' one another for respites. The concerns raised by the use of laptop computers and the remote or illicit access to information only scales as does the number of test takers.

Even without the complications proffered by a laptop computer, proctoring an examination, too, is a significant logistical task in the case of a large examination. Offering an examination and proctoring the same first requires locating eligible proctors (i.e., trustworthy individuals without a personal stake in the outcome of any given test taker) and determining their availability (i.e., can they be available to proctor the examination on a given date and time). Once eligible proctors are determined to be available, those proctors must then be trained or oriented with respect to the particulars of the examination or advised as to how to properly administer the examination (e.g., testing protocols, observing signs of cheating, confront the misbehaving test taker, and addressing potential test taker questions). Proctors must then be scheduled in the appropriate number at each testing site and then properly compensated for their time and efforts. In some instances, the costs involved with proctoring an examination may rival or exceed the costs related to actually preparing the examination.

Other tests are offered in the context of 'distance learning.' Distance learning is an instructional model that delivers education material and information to students who are not physically 'on site' at an educational facility. Distance learning creates and provides access to learning when the source of the information and the student are separated by time, distance, of both. Thousands of distance learners may be involved in a particular distance learning program or course at any given time.

Like any other educational program, there is a need to verify the qualifications of students through testing and examination. Because distance learners are not collectively gathered at a physical learning institution such as a university, the distance learning program requires that the students attend a testing center—which challenges the very purpose of distance learning—or administer an examination online. An online examination is difficult to proctor as a user could be taking an examination in one window of a web browser while looking up answers in another window via the Internet. A test taker could also utilize a 'chat' or 'messaging' application to relay questions to and receive answers from a knowledgeable third-party. The value of online examinations is, therefore, questionable and calls into question the overall value of the corresponding class or degree program.

There is a need in the art for improved proctoring of large scale examinations such that a small number of proctors can properly secure a test taking environment notwithstanding the large number of test takers. There is a similar need for remote proctoring of examinations. Remote proctoring, like on-site massed proctoring, would maintain the integrity of the testing environment by preventing test takers from accessing illicit information to aid in the completion of the examination.

SUMMARY OF THE CLAIMED INVENTION

A first claimed embodiment of the present invention is for a computer-readable storage medium. The storage medium includes a program executable by a processor to perform a method for securing a computing device during a testing event. The method includes the steps of receiving a set of protocols related to security of the testing event and modifying the system registry of the computing device to prevent execution of an application not in compliance with one or more of the set of protocols. The program further includes execution of a testing routine corresponding to the testing event. Any actions not in compliance with one or more of the set of protocols, including changes to or attempts to change any modifications to the system registry prior to completion of the testing routine are reported through execution of the program.

DETAILED DESCRIPTION

Embodiments of the presently disclosed invention provide for the security of a computing device in the context of a test taking environment. By securing a computing device, an individual (or group of individuals) may more effectively proctor a large examination without worrying about a test taker illicitly accessing information on their computer or via a remote source of data. Securing a computing device includes locking out or preventing access to any application not deemed necessary or appropriate by the test administrator.

Securing a computing device may further include allowing the test administrator access to the computing device before or during the examination. By granting access to the computing device, the test administrator may search for illicit files related to the examination or make determinations as to whether the test taker has attempted to disable (or has disabled) certain functionalities relates to locking out unnecessary or inappropriate applications on the computing device. Access to the computing device by a testing administrator may occur in the context of other applications being locked out for the duration of the examination.

Figure 1:
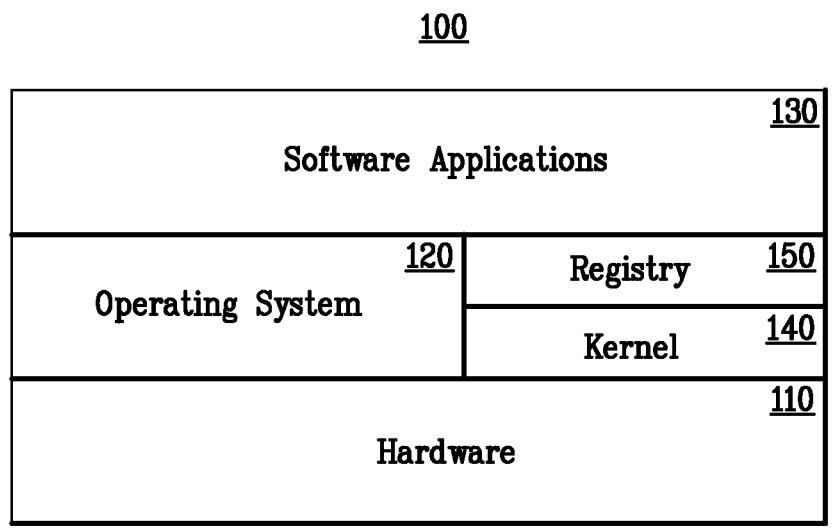
FIG. 1 illustrates the system architecture of a computing device as may be found in the prior art.

FIG. 1 illustrates the system architecture 100 of a computing device as may be found in the prior art. The system architecture 100 illustrated in FIG. 1 includes hardware 110, operating system 120, and software applications 130. The system architecture 100 of FIG. 1 is an exemplary abstraction and may include additional layers such as firmware, an assembler, and device drivers.

A computing device includes any number of hardware components 110 such as a central processor, memory, wireless chipset, and network interface. The computing device further includes a variety of software applications 130 such as a web browser, word processor, and electronic mail or chat clients. The operating system 120 serves as an interface between the hardware components 110 and software applications 130.

At the core of the operating system 120 is the kernel 140. The kernel 140 is the lowest-level abstraction layer for computing device resources such as memory, processors, and input/output components. The kernel 140 makes these resources available to software applications 130 by setting up address space, loading the file containing the application code into memory, and setting up an execution stack to allow for execution of the application and implementation of its corresponding functionality.

A system registry 150 is a database that stores settings and options for a particular operating system 120 installed on the computing device. The system registry 150 includes information and settings for the computing device hardware 110, the operating system software 120, and application software 130. The registry 150 may be manually edited in real-time through user interaction or in response to execution of a particular software application 130.

Figure 2:
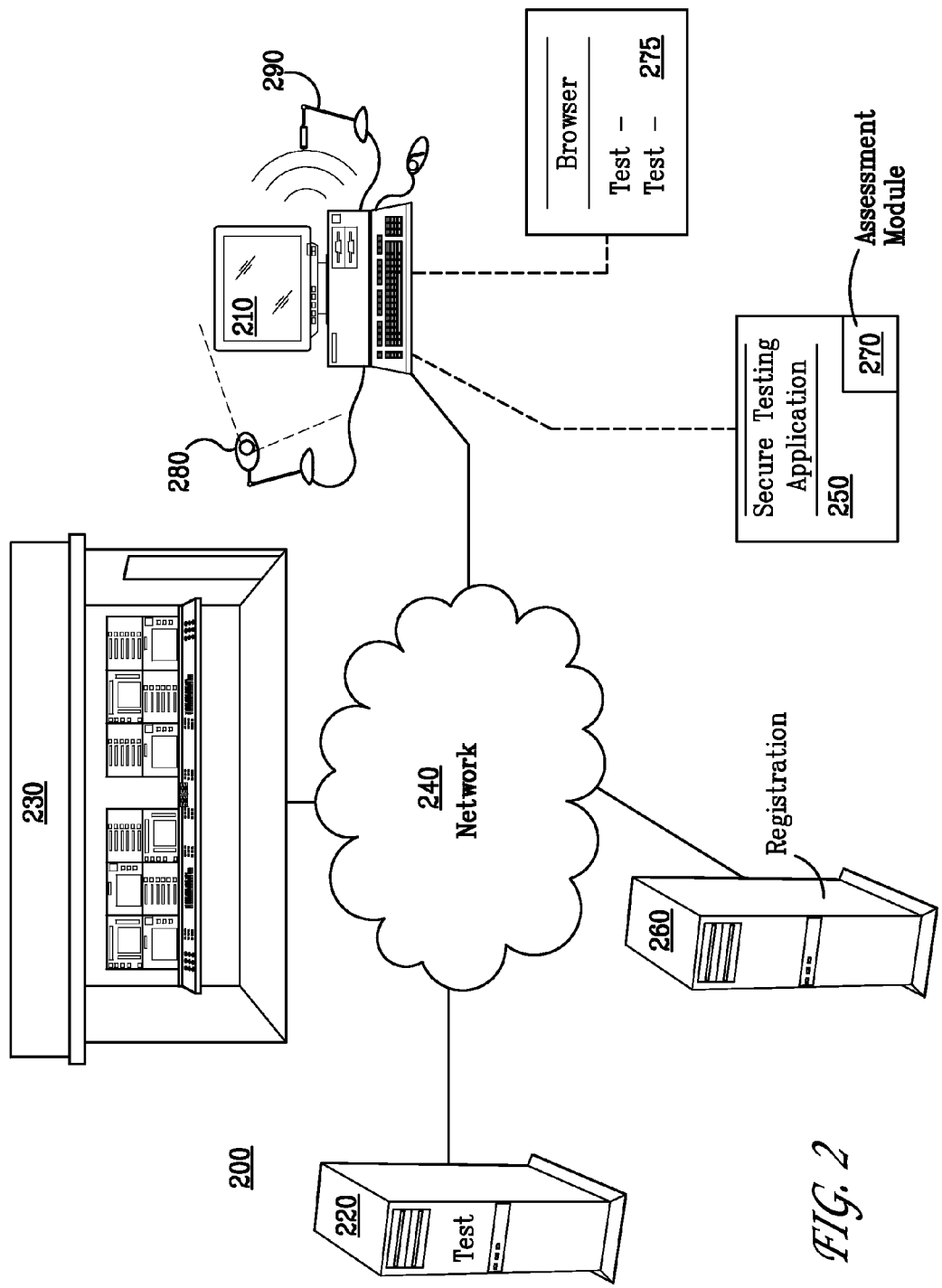
FIG. 2 illustrates a test taking system environment including a secure computing device.

FIG. 2 illustrates a test taking system environment 200 including a secure computing device 210. The system 200 of FIG. 2 includes the aforementioned secure computing device 210 that may be utilized in taking an examination, a testing server 220 for administering a test, a proctoring center 230, and a communications network 240. The communications network 240 allows for the online exchange of testing data by and between the computing device 210 and the testing server 220. The communications network 240 also allows for the observation of testing data and test taker behavior by the proctoring center 230. The computing device 210 of FIG. 2 may be secured for the taking of a test as described below.

Computing device 210 may be any sort of computing device as is known in the art and generally include a system architecture like that described in FIG. 1. Computing device 210 includes memory for storage of data and software applications, a processor for accessing data and executing applications, input and output devices that allow for user interaction with the computing device 210. Computing device 210 further includes components that facilitate communication over communications network 240 such as an RJ-45 connection for use in twisted pair-based 10baseT networks or a wireless network interface card allowing for connection to a radio-based communication network (e.g., an 802.11 wireless network).

Computing device 210 may be a general purpose computing device such as a desktop or laptop computer. Computing device 210 may be made secure through the implementation of, for example, the methodology described with respect to FIG. 3. The general computing device may belong to a particular test taker rather than being a computing device dedicated to test taking and as might otherwise be found in a testing center. Thin client or netbook client devices may be implemented in the context of computing device 210 as might mobile computing devices such as smart phones.

The computing device 210 may include any number of software applications including those described in the context of FIG. 1. In addition to software applications, the computing device 210 may—especially in the case of a personal computing device—include any number files or other types of data such as notes, outlines, and test preparation material. Possession of this data—as well as having access to certain applications that themselves allow for access to data (e.g., through a web browser)—during the course of a test or examination would prove highly advantageous to the test taker, but detrimental as to the accuracy or relevance of any resulting test data. Similar issues would exist with respect to a test-center computer that has access to the Internet or that might allow for the introduction of data through a portable storage device.

Testing server 220 is a computing device tasked with the delivery of testing data, including questions, and other related application packages to the computing device 210 by means of communications network 240. Like computing device 210, testing server 220 includes memory, a processor for accessing data and executing applications, and components to facilitate communication over communications network 240 including communications with computing device 210.

Proctoring center 230 is an operations center staffed by one or more persons observing various testing behaviors for one or more testing sites. Testing sites can be testing centers dedicated to the offering of tests and examination, traditional classroom settings, as well as personal space such as a home or office workspace. Proctoring center may observe and analyze a variety of different types of information to help ensure the integrity and security of a test and/or testing environment. The observation and analysis of information is described in further detail below with respect to assessment module 270 and camera device 280.

Communication network 240 may be a local, proprietary network (e.g., an intranet) and/or may be a part of a larger wide-area network. The communications network 240 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 240 allows for communication between the various components of test taking system environment 200.

In order to prevent access to files or other types of data such as notes, outlines, and test preparation material during an examination—as well as applications that themselves allow for access to data—it is necessary to secure computing device 210. Computing device 210 may be secured through the download and subsequent installation of secure testing application 250. Secure testing application 250 may be downloaded from testing server 220 or another computing device coupled to communications network 240 such as testing registration server 260. Secure testing application 250 may also be installed from a computer-readable storage device such as a CD-ROM. The testing security application may then be stored in memory at the computing device 210 and executed by a processor to invoke its corresponding functionality.

Secure testing application 250 is a security software application that prevents computing device 210 from accessing certain data or applications that might otherwise be in violation of testing regulations or protocols as identified by testing server 220. Secure testing application 250 causes the computing device 210 to operate in a secure mode by introducing certain changes to the system registry such that only those applications or files deemed necessary or appropriate by the test administrator and as embodied in a corresponding testing protocol may be allocated address space, loaded into memory and ultimately executed by the computing device 210.

For example, a testing protocol for a particular examination may deny access to a web browser, e-mail client, and chat applications such that a test taker may not electronically communicate with other individuals during the examination. This particular protocol may be downloaded to the client computing device 210 from the testing server 220 along with testing data. The secure testing application 250 then operates in accordance with the downloaded testing protocol such that the aforementioned applications are not allowed to be loaded and executed. Because the applications that may be installed on a computing device are all but infinite, the testing protocol may identify those applications that a user is allowed to access rather than those applications to which access is prohibited.

Similar prohibitions or permissions may apply to hardware components of the computing device 210 as well as any number of hardware peripherals that might be introduced to the computing device 210. Examples of such peripherals include a second computer monitor, docking stations, and a traditional full-sized keyboard as might be used with a laptop computer. Other peripherals might include thumb drives, 'time-shift' recording devices that offer TiVo®-like functionality, as well as any number of other plug-and-play peripherals.

A particularly apt example with respect to hardware at the computing device 210 concerns network connectivity. Network connectivity may be allowed prior to commencing an examination such that certain data may be downloaded. This data may include the actual test (e.g., prompts and questions) or other data concerning a test. Once the certain data is downloaded, however, network connectivity may be deactivated through 'locking out' a network card until the test is completed and the network card is released.

In other instances, however, network connectivity may be maintained throughout the course of the examination. This may be particularly relevant to a scenario where testing data is maintained at the testing server 220 and only displayed at the computing device 210. In such an instance, the test data itself may never be stored or downloaded at the computing device. In these and similar scenarios, it may be necessary to allow only certain data to be exchanged over the network connection. This would include both incoming and outgoing data.

In those instances where the secure testing application 250 allows access to certain applications on computing device 210, the functionalities of those applications may be limited. For example, a testing protocol may allow for activation of a web browser and network connectivity, but only to a single secure site providing testing data. The protocol may further or alternatively allow for exchanges of only certain types of data or data that has been certified for exchange. Such 'certifications' may include the presence of certain headers in the data or the data having been encrypted in a particular fashion. Similarly, the 'print' function of a particular application may be disabled. The testing protocol may include instructions on how certain application programming interfaces (APIs) for certain commercially available software applications are to be implemented or disabled by the secure testing application 250. Drivers may be managed in a similar fashion (e.g., a printer driver).

Access to certain applications, hardware, or functionality may be disabled or limited for a particular portion of an examination. As noted above, a network interface card may be temporarily disabled after an initial download of data. Once the test is complete, however, the network card may be re-enabled to allow for transmission of data or to allow for the free and general exchange of data rather than a more limited set under the control of the secure testing application 250.

The occurrence of certain milestones or events during a testing event may correspond to the enablement or disabling of hardware, software, or specific application functionality. For example, print functionality may be disabled during an examination to prevent a test taker from printing a copy of the examination and then delivering the copy to a friend so that they may review the questions before they take the examination. That functionality may be enabled, however, to allow the user to keep a copy of their answers sans the questions. The functionality may be re-enabled once a user clicks on a 'Test Complete' button or icon that locks in the test taker's answers and prevents them from being further manipulated once certain computing device 210 hardware, software, or functionality has been re-enabled that was otherwise disabled during the examination.

Because APIs vary in each application—and even between versions of the same application—the secure testing application 250 (per the testing protocol) may only allow for the use of certain versions or types of software applications (e.g., only version 3.0.13 of the Firefox web browser). If a user attempts to use a different version or type of application, the secure testing application 250 will prevent execution of that application or specific version thereof. The secure testing application 250 may further inform the user that an upgrade or different type of browser is required. As such, a test taker may be informed of certain system requirements in advance of an examination.

In some instances, it may be worthwhile to provide a native application 275 in conjunction with or as a part of the secure testing application 250. Native application 275 may encompass an application created by the testing administrator or otherwise developed specifically for administration of online examinations. Native application 275 may offer the general functionality of certain commercially available software applications, but without the functionality that offers possibility for engaging in illicit behavior during an examination. For example, a word processing application offers the ability for a user to produce the text for a document according to instructions. That same application, however, also allows the user the ability to access other notes created using the word processor.

In order to prevent illicit testing behavior, the word processor must allow for the generation of information through the usual input of data, but prohibit access to preexisting data. The word processor must also be prevented from 'pasting' data that might have been 'copied' from study notes immediately prior to the examination commencing. Notwithstanding, the test taker must still be allowed for a user to 'cut and paste' from originally generated answers during the course of the examination.

To implement these specific degrees of control, those specific limitations must first be identified and then conceived as to particular limitations (i.e., what is allowed and what is prohibited). A testing protocol must then be crafted that embodies these permission and prohibitions. To implement the protocol then requires interacting with various APIs, which is dependent upon a user having a particular type of software application and version thereof installed. A natively derived word processing application may simply offer requisite functionality rather than cobble together a series of permitted functions in a commercially available word processing application.

In other instances, a commercial application such as Word for Windows® may be hosted at the testing server 220 or some ancillary server in the testing environment 200 and allow for user access to the same during the examination. By maintaining centralized hosting of a requisite application, users are prohibited from exceeding the permitted use of that same application on their own computer 210. In such an instance, the computing device 210 utilized by the user (as well as that of the testing server 220) may require hardware or software to allow for such multiplexed access and interaction. In some instances, this software may be an integrated part of secure testing application 250. In other instances, however, a user may be required to install this software from a third-party, which may be certified by the entity offering the test or examination.

A natively derived application 275 prepared for use in the testing taking system environment 200 may be provided with respect to a web browser. This native browser may allow access to only those web sites directly related to the test (e.g., providing examination questions) or that provide pre-approved test materials such as manuals, regulations, or rules that might be referenced and cited by an applicant during an 'open book' type examination. A native application 275 might also encompass a uniquely generated offering of questions in the context of a multiple choice type examination. Such an application may be akin to a 'survey' that a user might otherwise take on any number of websites on the Internet. In such an application, the user is allowed to select a predetermined slate of options and only those options; access to any other applications on the computing device 210 becomes irrelevant and unnecessary.

A native application 275 may also operate in conjunction with a commercial application during testing. For example, a testing protocol may indicate that all chat or electronic-mail applications are to be disabled by the secure testing application 250, but that the test taker may use a commercially available word processing application with limited functionality. The test administrator may wish to offer technical assistance to the test taker during the course of the examination in case some aspect of the test becomes corrupted with respect to the delivery of data. A native application 275 dedicated to instant messaging or 'chatting' with an approved technical support agent may be provided for use during the examination.

Secure testing application 250 may include an assessment module 270. The assessment module 270 observes activity on the computing device 210 during administration of an examination. If a user attempts to make changes to the system registry that were implemented by the secure testing application 250, the assessment module 270 may identify and report these attempts to the proctoring center 230. The assessment module 270 may also check an output file for metadata or a keystroke log that might indicate an attempt to switch between accounts if a particular operating system allows for multiple users (each of which would have their own unique system registry) or operating system environments in the case of a computing device 210 operating with the user of a virtual machine. The assessment module 270 may further allow the proctoring center 230 a real-time look into modifications or activity occurring at the computing device 210 including changes at the registry level or activity occurring on-screen.

Secure testing application 250 may further include an assessment module 270, which operates in conjunction with a peripheral device such as camera device 280. The assessment module 270 operates in conjunction with the secure testing application 250 to deliver data to the proctoring center 230 for review and analysis to ensure testing integrity. For example, the camera device 280, which may be a commercially available web camera or other image acquisition device, may generate data of the test taking area and the test taker. If the test taker leaves their seat or another individual enters the testing area during the course of the examination, the camera device 280 will capture this visual information and provide that data to the assessment module 270. The assessment module 270, in turn, delivers the data to the proctoring center 230 for analysis.

The proctoring center 230 requires remote delivery of data. As such, a network connection is required to allow for delivery of that data from the computing device 210 to the proctoring center 230. The testing protocols as delivered by the testing server 220 may instruct the secure testing application 250 to allow the network card to remain enabled, but to limit network connectivity to certain ports. For example, with respect to electronic-mail, an SMTP service operates on port 25 while a POPS service operates with respect to port 110. The secure testing application 250 would prohibit access to ports 25 and 110, but would allow the use of port 755 with respect to accessing Microsoft Media Services, to the extent those services were used by the proctoring center 230 to observe video of the test taker at the computing device 210. The operability of a universal serial bus (USB) port to provide for connection of the camera device 280 to the assessment module 270 would likewise be required with respect to the testing protocols.

The proctoring center 230 may then determine if any visual activity constitutes activity not in accordance with the testing protocol. The proctoring center 230 may then log the information for further assessment by the actual test administrator (e.g., the professor or professional association administering the examination) or make a direct inquiry of the test taker as to the nature of the observed behavior and/or provide a warning as to terminate that behavior. Other external devices may be used to gather environmental data that can be reported to the proctoring center 230 in association with the assessment module 270 such as a microphone or other testing environment capture device 290.

The assessment module 270 may be used to collect registration information such as a name or testing identification number as well as a password. Other registration information might include biometric information such as a visual image of the user that is compared against a previously stored and known 'good' image of the user. A similar comparison may be made with respect to a voice print. Retinal scans and finger prints, subject to the presence of the appropriate peripheral device, may also be used for verifying test taker identity. These peripheral devices may be implemented in the context of a testing environment capture device 290.

A further registration technique may include the user typing in a previously typed in phrase. The nuances of the user having entered the sentence previously and during the actual testing event as they pertain to the natural speed, and pauses, and so forth may be observed and compared. As a result, the likelihood that the test taker is the purported test taker may be determined. All of the aforementioned information may be maintained in storage at a testing registration server 260. The testing registration server 260 may be maintained by the proctoring center 230, in a secure database of information at a site designated by the actual test administrator, or that of a third-party commercial vendor.

The assessment module 270 may also operate in conjunction with a testing protocol to properly execute a testing routine for the given testing event. For example, the testing routine may allow for the user to have access to all questions at any given time such that the user may answer and not answer questions at their leisure and subsequently return to any questions at a later time for further review. The testing routine may alternatively require the user to lock in an answer or set of answers and have the same reported to the testing server 220 prior to receiving a subsequent question. The routine may alternatively require that a question be locked in, but the actual answers are not delivered to the testing server 220 until conclusion of the examination, a portion of the examination, or as part of a regular batch transmission. Answer delivery may also occur in real-time. As such, the assessment module 270 and the testing server 220 may operate in a binary fashion with certain data being reported to the proctoring center 230 in conjunction with each answer. Other testing routine parameters might include time, number of questions answered, or number of questions answered correctly or incorrectly. Data exchanged between the testing server 220 and the assessment module 270 of the secure testing application 250 may be encrypted.

Figure 3:
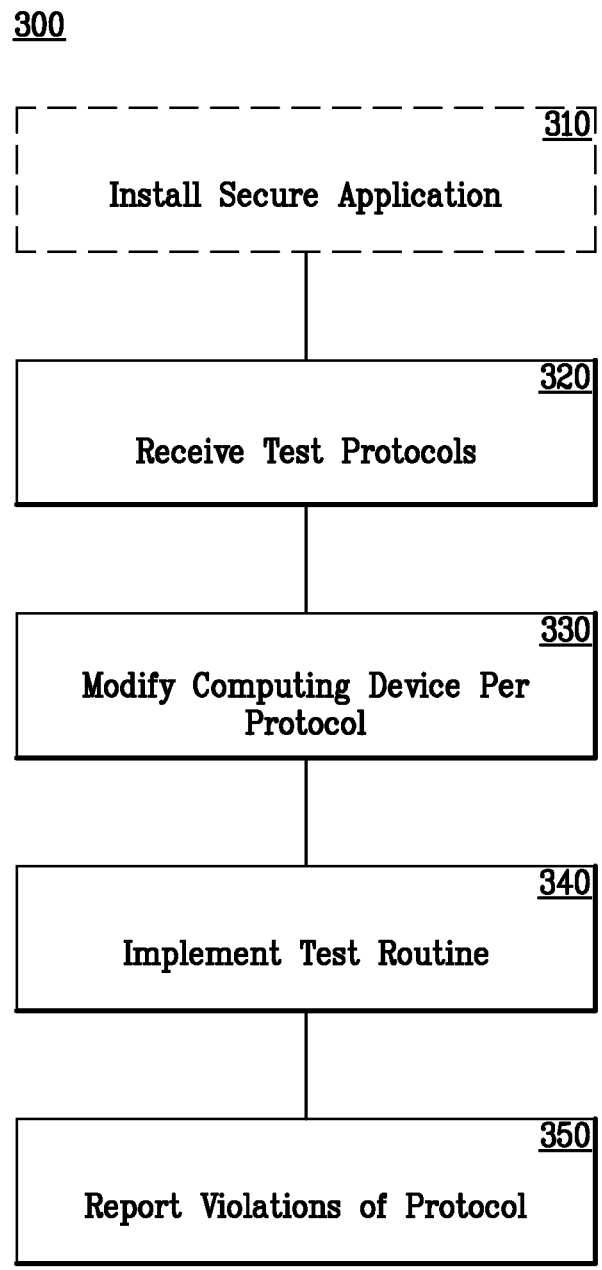
FIG. 3 illustrates a method for securing a computing device during a testing event.

FIG. 3 illustrates a method 300 for securing a computing device during a testing event. Through the method 300 of FIG. 3, a secure testing application 250 is installed. Protocols related to a testing event are delivered to the computing device 210 to be used during a testing event. The computing device 210 is made secure and the test is administered. During the course of the testing routine, certain observations as to the testing environment may be captured by an assessment module 270 and reported to a proctoring center 230 and/or testing server 220.

With respect to method 300, if a secure testing application 250 is not yet installed on a computing device 210 to be used during a testing event, the secure testing application 250 is downloaded and installed in step 310. The need to acquire the secure testing application 250 may be previously communicated to the test taker or may be indicated when the user attempts to access a testing server 220, but lacks the proper credentials to do so as the test taker has not been authenticated by means of the assessment module 270 in the secure testing application 250.

Following installation of the secure testing application 250, testing protocols are received at the computing device in step 320. These protocols are related to security of a particular testing event. The protocols are delivered to the computing device 210 by the testing server 220. Some protocols may be universal and pre-implemented in the secure testing application 250 such as requiring authentication of a user prior to commencing an examination.

At step 330, the testing protocols are implemented with respect to various hardware, software, and functional aspects of the computing device 210. Implementing the testing protocols may include modifying the system registry of the computing device 210 to prevent certain hardware, software, or other functionality from being implemented. These changes to the system registry may be 'undone' once the secure testing application 250 completes is execution (i.e., the test is complete). As such, the secure testing application 250 may maintain a record of changes it makes to the system registry to allow for proper editing back to an original setting. These records may also be maintained in order to allow the assessment module 270 to make a determination whether any attempted to circumvent the secure testing application 250 have been made.

In step 340, the testing routine is implemented in accordance with various testing protocols. The testing routine includes acquisition and delivery of test data to the computing device 210, which may occur during registration and verification of the test taker at registration server 260 prior to commencing the examination. The testing routine may further include delivery of test answers back to the testing server 220. A proctoring center may receive copies of test answers for the purpose of ensuring test integrity, but such receipt is not necessarily required in implementation of system 200.

In step 350, violations of testing protocols are reported to the proctoring center 230. Violations may also be reported to the testing server 220. Data related to violations may be captured by camera device 280 and/or testing environment capture device 290, which may include a microphone. This data is reported to the assessment module 270, which then reports the data to the aforementioned proctoring center 230 for analysis. Data related to attempts to circumvent registry changes related to maintaining the security of the computing device 210 during the testing event may likewise be reported. Violations may be reported as they occur in real time, on-demand in response to a proctor query, or as part of a regular batch of data.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, or any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise

What is claimed is:

1. A non-transitory computer readable storage medium having embodied thereon a program, the program being executable by a processor to perform a method for securing a computing device during a testing event, the method comprising:

receiving a testing protocol for the testing event, the testing protocol including limitations to be applied to the computing device during the testing event, the testing protocol received from a test server by the computing device over a communication network, wherein a testing routine delivers test data in accord with the testing protocol, the test data including test answers to test questions answered by a test-taker during the testing event;

granting access to the computing device before initiating execution of the testing routine, wherein granting access to the computing device allows the computing device to be searched for illicit files related to the testing routine;

applying the limitations by modifying a system registry of the computing device in accordance with the testing protocol, the system registry modified before executing the testing routine;

initiating execution of the testing routine corresponding to the testing event, the execution initiated after the system registry has been modified;

observing a keystroke log for attempts to switch to another account with a different system registry;

transmitting to a proctoring center in real-time a feed of on-screen activity displayed on the screen of the computing device, the transmission automatically triggered when the computing device detects an attempt to change the system registry of the computing device that is not in accordance with the testing protocol during the testing routine;

transmitting to the proctoring center in real-time the feed of the on-screen activity displayed on the screen of the computing device, the transmission automatically triggered when the computing device detects an attempt to switch to another account with a different system registry;

sending the test answers to the test server over the communication network when the testing routine is complete; and locking the test answers when the testing routine is complete.

2. The non-transitory computer readable storage medium of claim 1, wherein the limitations include limitations for the computing device during a particular portion of the testing routine.

3. The non-transitory computer readable storage medium of claim 1, wherein the limitations include prohibiting execution of an application on the computing device.

4. The non-transitory computer readable storage medium of claim 3, wherein the limitations identify applications allowed to execute on the computing device.

5. The non-transitory computer readable storage medium of claim 1, wherein the limitations include limiting functionality of an application when executed on the computing device.

6. The non-transitory computer readable storage medium of claim 1, wherein the limitations include prohibiting access to certain data stored in memory of the computing device.

7. The non-transitory computer readable storage medium of claim 1, wherein the limitations include restricting use of a hardware device of the computing device.

8. The non-transitory computer readable storage medium of claim 7, wherein the hardware device is a network interface card of the computing device.

9. The non-transitory computer readable storage medium of claim 8, wherein the limitations include allowing only certain types of data to be exchanged via the network interface card.

10. The non-transitory computer readable storage medium of claim 8, wherein the limitations include disabling network connectivity of the network interface card for a particular portion of the testing routine.

11. The non-transitory computer readable storage medium of claim 1, wherein the limitations correspond to occurrences of particular events of the testing routine.

12. The non-transitory computer readable storage medium of claim 1, wherein the computing device locks the test answers after a test-taker clicks on a test complete icon.

13. The non-transitory computer readable storage medium of claim 1, wherein the computing device locks the test answers after a test-taker activates a test complete button.

14. The non-transitory computer readable storage medium of claim 1, wherein the computing device locks the test answers after an allotted time period.

15. The non-transitory computer readable storage medium of claim 1, further comprising the test routine receiving the test questions from the testing server.

16. The non-transitory computer readable storage medium of claim 1, wherein environmental data is collected and sent to the proctoring center.

17. The non-transitory computer readable storage medium of claim 16, wherein the proctoring center is the test server.

18. The non-transitory computer readable storage medium of claim 16, wherein at least a portion of the environmental data are collected by a microphone.

19. The non-transitory computer readable storage medium of claim 16, wherein at least a portion of the environmental data are collected by a camera.

* * * * *